United States Patent [19]

Bugni et al.

[11] Patent Number: 4,959,716
[45] Date of Patent: * Sep. 25, 1990

[54] T.V. INPUT SOURCE IDENTIFIER RESPONSIVE TO JITTER AND NOISE

[75] Inventors: Anthony R. Bugni; Larry G. Phillips; Ted A. Darby; Saiprasad V. Naimpally, all of Knoxville; William S. Burdick, Strawberry Plain, all of Tenn.

[73] Assignee: North American Philips Corporation, New York, N.Y.

[ * ] Notice: The portion of the term of this patent subsequent to Nov. 15, 2005 has been disclaimed.

[21] Appl. No.: 436,521

[22] Filed: Nov. 14, 1989

Related U.S. Application Data

[63] Continuation of Ser. No. 239,089, Aug. 31, 1988, Pat. No. 4,905,083, Continuation-in-part of Ser. No. 119,603, Nov. 12, 1987.

[51] Int. Cl.$^5$ .................... H04N 17/00; H04N 5/04; H04N 17/02
[52] U.S. Cl. ..................................... 358/139; 358/10; 358/148
[58] Field of Search .................. 358/10, 139, 148, 160

[56] References Cited

U.S. PATENT DOCUMENTS

| | | | |
|---|---|---|---|
| 3,904,823 | 9/1975 | Van Straaton | 358/148 |
| 3,916,102 | 10/1975 | Merrell | 358/158 |
| 4,158,857 | 6/1979 | Hiraguri | 358/148 |
| 4,180,829 | 12/1979 | Pires | 358/139 |
| 4,298,890 | 11/1981 | Vai | 358/158 |
| 4,335,403 | 6/1982 | Srivastava | 358/148 |
| 4,425,581 | 1/1984 | Schwappe | 358/148 |
| 4,562,457 | 12/1985 | Salvia | 358/19 |
| 4,665,437 | 6/1987 | Nicholson | 358/148 |
| 4,683,495 | 7/1987 | Brock | 358/148 |
| 4,729,023 | 3/1988 | Srivastavoa | 358/148 |

Primary Examiner—John K. Peng
Attorney, Agent, or Firm—Edward W. Goodman

[57] ABSTRACT

A T.V. input source identifying circuit for determining whether a video signal is from a videotape player or a broadcast signal by measuring jitter of vertical synchronization pulses and by measuring noise. The video signal includes a plurality of frames with each frame including a plurality of fields. In one embodiment of the present invention, timing data is generated corresponding to the period of at least one selected field in each of a plurality of selected frames. From this timing data, a maximum number is stored that corresponds to the greatest period and a minimum number is stored that corresponds to the least period of the selected fields. The minimum number is subtracted from the maximum number and the difference is compared to a threshold to determine the type of video signal. In an alternate embodiment, numbers corresponding to fields from successive frames are compared by a subtraction and the difference is compared to a threshold in order to make a decision as to the type of video signal. In both of the aforementioned embodiments, the noise level of the video signal is constantly monitored. When the noise is above a threshold, the local signal is generated regardless of the information derived from the timing data.

2 Claims, 3 Drawing Sheets

T.V. INPUT SOURCE IDENTIFIER RESPONSIVE TO JITTER AND NOISE

This is a continuation of application Ser. No. 07/239,089, filed Aug. 31, 1988.

FIELD OF INVENTION

The present invention relates to circuits that determine the type of video signal source and, particularly, relates to a circuit that measures jitter and noise to determine whether a video signal source is a local tape player or a broadcast signal source. The present application is a continuation of application Ser. No. 07/239089 filed Aug. 31, 1988 which is a continuation in part of U.S. application Ser. No. 119,603, entitled T.V. INPUT SOURCE IDENTIFIER, filed Nov. 12, 1987.

BACKGROUND OF INVENTION

With increasing use of home video recorders/players (referred to hereinafter as VCRs) there is an increasing need to determine whether a video signal is from a VCR or is a broadcast signal. It is desirable to provide a display on a television receiver to indicate to the viewer whether he is watching a VCR playback or a broadcast program, and the television itself may advantageously use such information. For example, an identifier signal indicating the type of video signal would enable other circuitry in the television to select the best method for achieving synchronization with the video signal. Also, such identifier signal would be useful in controlling a pay T.V. system.

With the increasing need to determine the type of video signal sources, there arises an increased need for an accurate and reliable method for making this determination. Reliability in producing an identifier signal is hampered by the wide quality range of signals produced by VCRs and by the wide range of signal-to-noise ratios found in T.V. broadcast signals. Thus, a need exists for a circuit that will reliably identify a VCR signal and a T.V. broadcast signal despite the difficulties posed by the expected operating conditions.

SUMMARY OF THE INVENTION

It has been determined that a video signal from a home VCR may be identified and distinguished from a broadcast signal by monitoring both jitter and noise and, particularly, by monitoring jitter on the vertical synchronization pulses of the video signal. It has further been determined that a noisy T.V. broadcast signal will appear to have jitter on the vertical synchronization pulses similar to that of a high quality home VCR. Thus, provision is made in the circuit of the present invention to prevent the circuit from being fooled by a noisy broadcast signal and identifying such noisy broadcast signal as a VCR signal.

In accordance with one embodiment of the invention, an apparatus is disclosed for analyzing a video signal and determining whether the video signal is from a local playing device or a broadcast signal source. The video signal contains a plurality of frames and each frame contains a plurality of fields. The fields have a time period or duration. Ideally, the time period of each field would be identical but, in reality, these time periods may be different. The difference is sometimes referred to as jitter.

The embodiment includes a circuit for receiving the video signal and for generating timing data corresponding to the period of at least one selected field in each frame of a plurality of selected frames. A storage circuit receives the timing data and stores a maximum number corresponding to the greatest period of any one of the selected fields and it stores a minimum number corresponding to the least period of any one of the selected fields. Then, a judgment circuit compares the maximum number to the minimum number and produces a local signal when the difference is greater than or equal to a predetermined threshold to indicate that the video signal is from a local video playing device. The judgment circuit also generates a nonlocal signal when the difference is less than the predetermined threshold to indicate that the video signal is from a broadcast signal source.

In a preferred embodiment, the apparatus may further include means for monitoring the signal-to-noise ratio of the video signal and for controlling the production of the local and nonlocal signals according to the signal-to-noise ratio. Also, in another embodiment, the signal-to-noise ratio is compared to a selected threshold and a force signal is produced when the ratio is less than the threshold. An override circuit forces the production of the nonlocal signal in response to the force signal thereby indicating that the video signal source is a broadcast signal whenever the signal-to-noise ratio is less than the selected threshold.

In another embodiment, the storage means receives and stores two numbers corresponding to the period of a field in the last frame and the frame immediately preceding the last frame, and the memory is refreshed with each frame. In this configuration, the judgment means compares the two numbers in storage and produces a local signal when the difference between the two numbers is greater than or equal to a predetermined threshold to indicate that the video signal is from a local video playing device and it generates a nonlocal signal when the difference is less than the threshold. In this manner, the judgment means is constantly comparing the time periods of corresponding fields in successive frames It will be appreciated that, of the two embodiments described above, the one that finds maximum and minimum numbers can be best designed to avoid identifying a high quality VCR signal as a broadcast signal. A high quality VCR signal may have only a small amount of jitter between successive frames, but over a plurality of frames the time periods of the fields will vary significantly. That is, the jitter between fields of adjacent frames may be small in a high quality home VCR signal when compared to the jitter between fields separated by ten frames, for example. Thus, by comparing the largest field period to the smallest field period in a plurality of frames, preferably fifteen frames, one should still find significant jitter so that the signal may be identified as being from a VCR.

However, an advantage of the embodiment which compares corresponding fields from successive frames is that it makes a faster judgment. Although it does have more of a tendency to erroneously identify high quality VCR signals as broadcast signals, this problem can be alleviated somewhat by adjusting the threshold value used in this particular embodiment.

BRIEF DESCRIPTION OF THE DRAWINGS

The present invention may be best understood by reference to the following Detailed description of preferred embodiments when considered in conjunction with the following drawings in which.

DETAILED DESCRIPTION OF PREFERRED EMBODIMENTS

Figure 1:
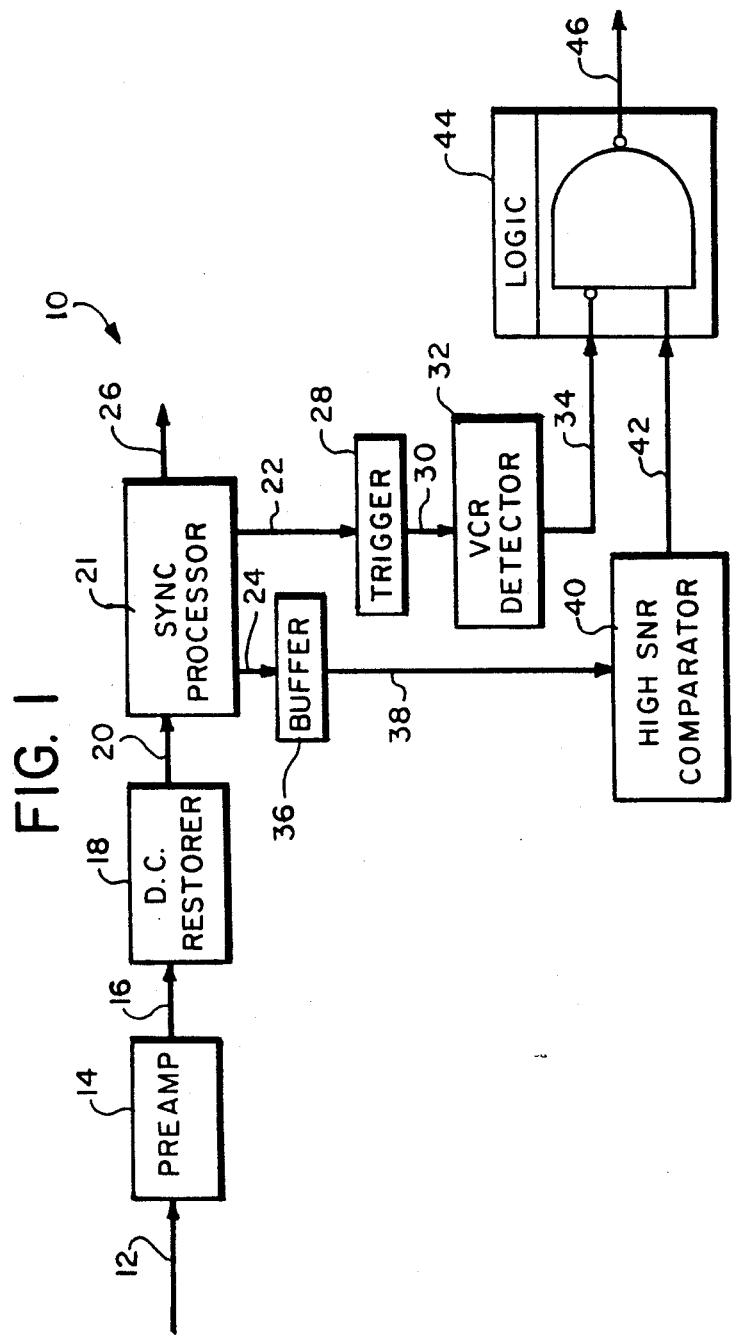
FIG. 1 is a schematic block diagram of the T.V. input source identifier including a noise override circuit.

Referring now to the drawings in which like reference characters designate like or corresponding parts throughout the several views, there is shown in FIG. 1 a block diagram of a T.V. input source identifier 10 representing one form of the present invention. In this circuit, a video signal in a television receiver is applied through line 12 to a video preamp 14. The output of the preamp 14 is applied through line 16 to a DC restore 18 and the reconstructed video signal is, then, transmitted by line 20 to a synchronization processor 21. The processor 21 produces a series of pulses known as the vertical drive on output line 22, and these pulses correspond to the vertical synchronization signal of the input video signal appearing on line 12. Thus, the time between the pulses of the vertical drive appearing on line 22 corresponds to the time period of a field in the video signal appearing on line 12.

The processor 21 also produces a signal corresponding to the signal-to-noise ratio on line 24 and produces a sandcastle signal on line 26.

The vertical drive appearing on line 22 is input to a Schmidt trigger 28 whose output appears on line 30 and is applied to a VCR detector 32. Jitter is monitored by the detector 32 in the manner hereinafter described in greater detail and a determination is made as to whether the video signal is from a VCR or from a broadcast signal source. If it is a VCR signal, the output of the detector 32 appearing on line 34 is low.

Referring again to the processor 21, three signal levels are produced on line 24 depending on the signal-to-noise ratio. If the signal-to-noise ratio is high, meaning it is essentially noise free, six and one-half (6.5) volts is produced on line 24. When the signal to noise ratio is about 21 db, a ten (10) volt signal is applied to line 24 and when the signal-to-noise ratio is very low (less than about 5 db) indicating a very noisy video signal or no video signal, three tenths (0.3) volt is applied to line 24. The signal on line 24 is applied through a buffer 36 and line 38 to a comparator 40. The output of comparator 40 is high if 6.5 volts appear on line 24, but if 0.3 volts or 10 volts appear on line 24, the output of comparator 40 on line 42 is low. The outputs appearing on lines 34 and 42 are applied as inputs to the logic gate 44 which functions as a gate with one inverted input The input to which line 34 is attached is inverted.

Thus, if 6.5 volts appear on line 24 indicating a noise free signal, a high signal is applied on line 42 and the output of the logic gate 44 will follow the output of the VCR detector 32. That is, if line 34 goes low, the output of the gate 44 which appears on line 46 will also go low indicating that the video signal is from a VCR. If the output on line 34 goes high, line 46 will also go high indicating that the source is a broadcast television signal.

If either 10 volts or 0.3 volts appear on line 24, then the output of the comparator 40 will go low and it will, thus, force the logic gate 44 to always generate a high signal on line 46. Regardless of the signal appearing on line 34, the output of gate 44 on line 46 will always be high and indicate the presence of a television broadcast signal In this manner, the circuitry associated with the comparator 40 and the logic gate 44 functions as an override circuit that forces the indication of a television broadcast signal whenever the video signal is noisy (signal-to-noise less than 21 db). If the signal is not noisy, the VCR detector 32 will identify the source of the video signal as described above.

Figure 2:
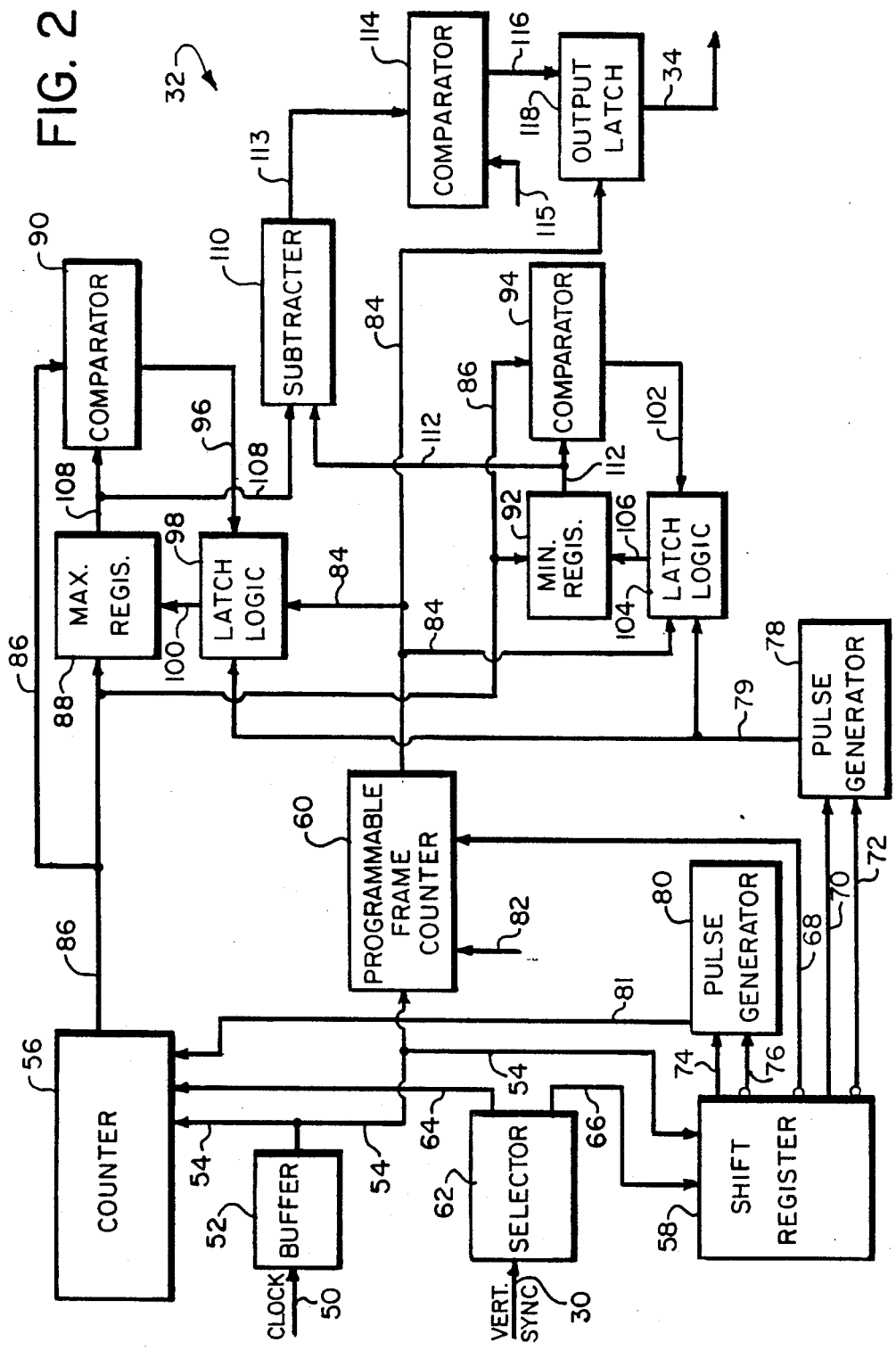
FIG. 2 is a schematic block diagram of a VCR detector circuit that compares the maximum period to the minimum period of corresponding fields in a selected number of frames of a video signal.

Referring now to FIG. 2, there is shown a block diagram of one embodiment of the VCR detector 32 which is also shown in FIG. 1. Referring to the upper left corner of FIG. 2, a 14.318180 megahertz clock signal is applied on line 50 to an inverting buffer 52, the output of which is applied on line 54 to a 9 bit counter 56. Lines 54 also apply the output of the buffer 52 to a 5 bit shift register 58 and a programmable frame counter 60. In this manner, the counter 56, the shift register 58 and the programmable frame counter 60 receive the same clock signal.

A vertical synchronization pulse signal, also referred to as a vertical drive, is applied by line 30 to an every other field selector 62. The non-inverted output of selector 62 is applied by line 64 as a counter signal to the 9 bit counter 56, and the inverted output of selector 62 is applied on line 66 as a data input to the shift register 58 One function of the selector 62 is to enable the counter 56 to start counting so that it counts during every other field of the video signal. Given the high frequency of the input clock signal, the 9 bit counter will quickly overflow and, at the end of a field when the counter 56 is stopped, an "underflow" number will appear in the counter 56 which corresponds to the time period of a field being observed during the count. In this manner, the counter 56 will count during every other field and is idle during the remaining fields.

The function of the 5 bit shift register is to synchronize the logic operations of detector 32 with the 14.318180 megahertz clock. All of the outputs of the shift register 58 are delayed by one or more clock periods Thus, the inverted signal on line 66 appears on line 68 delayed by one clock period; on line 70 delayed by three periods; on line 72 delayed by four periods; on line 74 delayed by four periods; and on line 76 delayed by five periods The signals on lines 68, 72 and 76 are inverted with respect to the input of shift register 58 which appears on line 66. The outputs appearing on lines 74 and 76 are applied to counter clear pulse generator 80 which generates a single clock pulse that is applied through line 81 to the 9 bit counter 56 to clear it. Precisely when this clear pulse is created is unimportant except that it should occur after the functions controlled by the signals on lines 68, 70 and 72

Line 68 is applied as an input to the programmable frame counter 60 which counts the number of frames. Since the signal appearing on line 68 has already been through the every other field selector 62 and since each frame contains two fields, the signal frequency on line 68 directly corresponds to the frame frequency. A program signal is applied on line 82 to adjust the number of frames counted by the frame counter 60 and, in the preferred embodiment, the signal on line 82 is operable to adjust the frame count in increments of five frames so that the counter will count any increment of five frames between five and eighty frames. When the frame counter counts the selected number of frames, an output signal is applied on line 84 to indicate that such count has been completed.

Referring again to the 9 bit counter 56, its output is applied on nine lines 86 to a maximum number register 88, a comparator 90, a minimum number register 92 and a comparator 94. The number in the maximum number register 88 is output through lines 108 to comparator 90, and the comparator 90 compares the number in the 9 bit counter 56 with the number in the maximum number register 88. It provides a signal on line 96 that will control the maximum number register 88 so that it will store the larger of the two numbers. If the number already in the maximum number register 88 is the larger number, the signal on line 96 that is applied to latch logic 98 will cause register 88 to do nothing. However, if the number in counter 56 is greater than the number in register 88, the control signal on line 96 will cause the latch logic 98 to produce a pulse on line 100, thereby, causing register 88 to store the number from counter 56. In a similar manner, comparator 94 causes register 92 to store the smaller of either the number already stored in register 92 or the number in counter 56. If the counter 56 contains the smaller number, the comparator 94 will produce a signal on line 102 that is applied to latch logic 104 causing it to apply a clock pulse on line 106. This pulse is applied to the minimum number register 92 and causes it to store the number contained in the 9 bit counter 56. If the smaller number already appears in the register 92, the comparator 94 will not cause register 92 to do anything. The output of maximum number register 88 is also applied through lines 108 to a subtracter 110. In a similar manner, the output of minimum register 92 is applied through lines 112 as an input to the subtracter 110. In the subtracter 110, the minimum number from register 92 is subtracted from the maximum number from register 88 and the difference is applied through lines 113 to a comparator 114. A threshold has been programmed into the comparator 114 through lines 115 and this threshold is compared to the difference appearing on lines 113. If the difference is less than the threshold, there is very little jitter, if any, in the input signal and the comparator 114 determines that a broadcast signal is present. In such case, the output of the comparator 114 appearing on line 116 is high and is applied to output latch 118 which will cause a high output on the output line 34. If the difference is greater than or equal to the threshold, the signal on lines 116 and 34 go low.

The timing for the flow of data through the VCR detector 32 is provided by the signals appearing on lines 68, 70, 72, 74 and 76. The signal appearing on line 68 is the first signal to change and it is applied to the programmable frame counter 60 which counts the number of frames. The next two signals to change are those appearing on lines 70 and 72. These signals are applied to pulse generator 78 which creates a one clock pulse that is applied simultaneously through line 79 to latch logics 98 and 104. This pulse causes the latch logics 98 and 104 to look at the signal appearing on lines 96 and 102, respectively, and causes the registers 88 and 92 to either hold the number presently in the register or store the number found in 9 bit counter 56. In this manner, the counter 56 counts for a field period and then rests for a field period. At the end of first field when the counter stops counting, an underflow number appears on register 56 and, during the next field while the counter 56 is resting, latch logics 98 and 104 actuate the registers 88 and 92. In this manner, the two registers 88 and 92 are being constantly updated.

When the programmable frame counter 60 counts out to the predetermined number of frames, a high signal appears on line 84. This signal is applied to latch logics 98 and 104 which in turn cause registers 88 and 92 to store whatever number that is contained in the 9 bit counter 56. In this manner, the registers are reset and primed with a number so that they can begin the process of again finding maximum and minimum numbers in a preselected number of frames. The output on line 84 is also applied to the output latch 118. When a pulse appears on line 84, the output latch 118 looks at the signal on line 116 and produces an output on line 34 accordingly. If the signal on line 116 is low, line 34 goes low. If line 116 is high, line 34 goes high. Latch 118 will hold the output on line 34 until another pulse appears on line 84. In this manner, the output on line 34 is constant during the entire time that registers 88 and 92 are searching for maximum and minimum numbers.

Referring again to comparator 114, it will be appreciated that the threshold that is programmed into this comparator determines whether the video signal is from a VCR or from a broadcast signal source. In the preferred embodiment, a threshold count of 9 is used. This threshold is chosen because even the best home VCRs are typically incapable of producing a signal that is sufficiently jitter free to achieve a count as low as 9 in the comparator 114 and broadcast signals typically produce counts that are much smaller than 9. Thus, it has been found that 9 is a good threshold number for comparator 114. Also, it should be mentioned that fifteen frames are observed in order to find maximum and minimum numbers In Applicant's experiments it was determined that fifteen frames was an appropriate number of frames for frame counter 60, and it was observed that for most broadcast signals the difference between the maximum and minimum numbers of registers 88 and 92, respectively, after fifteen frames was less than 2. It is noted that, since a 14.31818 megahertz clock is used, one clock count corresponds to 0.07 microsecond.

It was further observed that for the best home VCRs, the difference between the maximum and minimum numbers after fifteen frames was nine (9) or greater. Thus, assuming that the frame counter 60 is set to count fifteen frames, the threshold of comparator 114 may be set anywhere in the range of 2 to 9 clock counts (0.14 to 0.63 microseconds), and preferably 9 clock counts (0.63 microseconds). If the difference is less than the threshold, it is an indication that the signal source is a broadcast signal. It will be appreciated that these threshold settings are based on observing 15 frames. If more frames are observed the thresholds would be raised.

It was further observed that as the noise in the broadcast signal was increased, the difference number increased. When the signal to noise ratio reached about 20 db, the difference number occasionally equaled or exceeded 9. Thus, the high SNR comparator 40 is set to override the VCR detector 32 whenever the signal to noise ratio falls to or below about 21 db.

Figure 3:
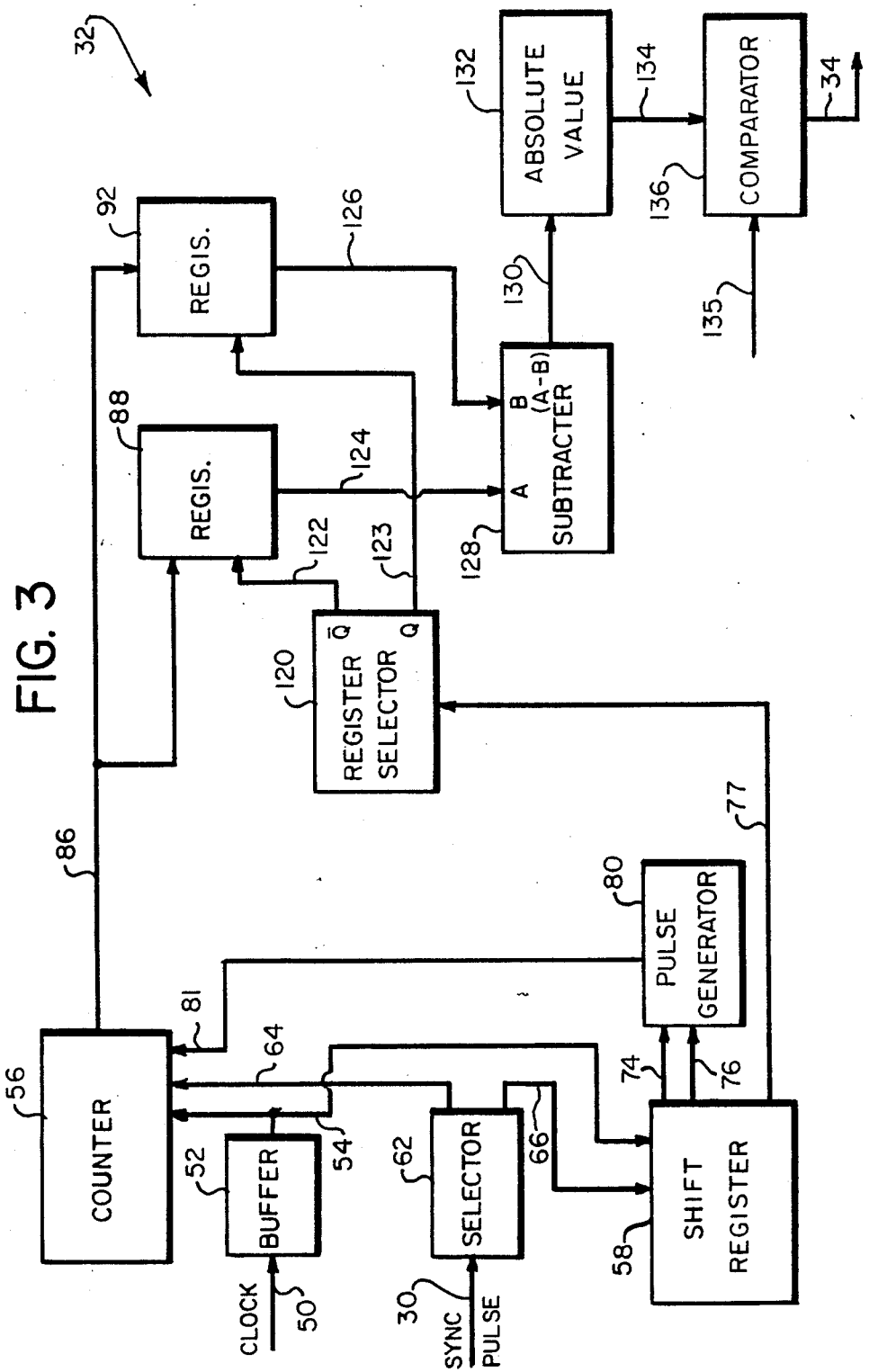
FIG. 3 is a schematic block diagram of a VCR detector circuit that compares the periods of corresponding fields in successive frames of a video signal.

Referring now to FIG. 3, another embodiment of the VCR detector 32 is shown. In this embodiment, the detector looks at one field from every frame and compares it to the corresponding field of the previous frame. In this embodiment, the inverting buffer 52, the counter 56, the every other field selector 62, the 5 bit shift register 58, and the counter clear pulse generator 80 function in a manner similar to that disclosed above in the discussion concerning FIG. 2. In this embodiment, the vertical synchronization pulses are applied through the every other field selector 62, through line 66, through shift register 58 and through line 77 to a register selector 120. The leading edges of the signals appearing on line 77 are timed by the shift register 58 to occur prior to the pulse produced by pulse generator 80. The register selector 120 is a divide by two selector and it applies an inverted output to a 9 bit register 88 and applies a noninverted output to a 9 bit register 92. Registers 88 and 92 correspond to the registers in FIG. 2 of the same numbers, except that they are controlled differently. In the embodiment of FIG. 3, the register selector 120 applies signals through lines 122 and 123 and causes the number stored in counter 56 to be alternately stored in registers 88 and 92. Thus, one of these two registers always contains the latest complete count from the counter 56 and the other of registers 88 and 92 will always contain the previous count. The outputs of registers 88 and 92 are applied through lines 124 and 126, respectively, to an subtracter 128. The output of register 92 is applied to a subtracter 128 in which the number in register 92 is subtracted from the number in register 88. In this manner, the output of subtracter 128 which appears on lines 130 is the difference between the two numbers appearing in registers 88 and 92. The difference signal appearing on lines 130 is applied to an absolute value circuit 132 which converts the signal to an absolute value that is applied through line 134 to a comparator 136. The comparator compares the difference appearing on lines 134 to a threshold that is programmed by a signal appearing on line 135. In the preferred embodiment, the threshold is two. Thus, if the difference signal appearing on lines 130 is greater than or equal to two, comparator 136 produces a low signal on line 34 indicating that the video signal is from a VCR. If the difference is equal to one or zero, the output on line 34 and goes high indicating that the input video signal is a television broadcast signal.

It will be appreciated that the circuit described with respect to FIG. 2 is more likely to accurately identify a high quality VCR signal since it compares maximum and minimum numbers derived from numerous frames, preferably 20 frames. On the other hand, the circuit shown in FIG. 3 is less expensive, reasonably reliable, and produces a faster indication of whether the video signal is from a VCR or is a broadcast signal. The reliability of the circuit of FIG. 3 can be adjusted somewhat by adjusting the threshold of the comparator 136 which is provided by a signal appearing on line 135. This signal is preferably fixed by the designer. In like manner, the threshold used by the comparator 114 of FIG. 2 may be varied by changing the signal appearing on line 115.

Although particular embodiments have been described in the foregoing detailed description, it will be understood that the invention is capable of numerous rearrangements, modifications and substitutions of parts without departing from the scope of the invention as defined by the appended claims. For example, while it is preferred to observe every other field, one may also chose to observe all fields or fewer than every other field without departing from the scope of the invention.

What is claimed is:

1. An apparatus for analyzing a video signal containing a plurality of frames with each frame containing at least one field and each field having a time period and for determining whether the video signal is from a local video playing device or a broadcast signal source, comprising:

means for receiving the video signal and for generating timing data corresponding to the period of at least one selected field in each frame;

storage means for receiving the timing data and storing at least two numbers corresponding to the periods of the selected fields in two adjacent frames; and judgment means for comparing the two numbers in the storage means and producing a local signal when the difference between the two numbers is greater than or equal to a predetermined threshold to indicate that the video signal is from a local video playing device and for generating a nonlocal signal when the difference is less than the predetermined threshold to indicate that the video signal is from a broadcast signal source.

2. The apparatus of claim 1, wherein said storage means stores numbers from corresponding fields in the selected frames.

* * * * *